United States Patent
Chan et al.

(10) Patent No.: US 9,681,133 B2
(45) Date of Patent: Jun. 13, 2017

(54) TWO BINS PER CLOCK CABAC DECODING

(71) Applicant: Intel Corporation, Santa Clara, CA (US)

(72) Inventors: Hiu-Fai R. Chan, Rancho Cordova, CA (US); Samuel Wong, Santa Clara, CA (US); Scott W. Cheng, Folsom, CA (US); Mohmad I. Qurashi, Orangevale, CA (US)

(73) Assignee: Intel Corporation, Santa Clara, CA (US)

( * ) Notice: Subject to any disclaimer, the term of this patent is extended or adjusted under 35 U.S.C. 154(b) by 809 days.

(21) Appl. No.: 13/729,367

(22) Filed: Dec. 28, 2012

(65) Prior Publication Data

US 2013/0259116 A1    Oct. 3, 2013

Related U.S. Application Data

(60) Provisional application No. 61/617,333, filed on Mar. 29, 2012.

(51) Int. Cl.
*H04N 19/00* (2014.01)
*H04N 19/91* (2014.01)
*H04N 19/90* (2014.01)

(52) U.S. Cl.
CPC ....... *H04N 19/00945* (2013.01); *H04N 19/91* (2014.11)

(58) Field of Classification Search
None
See application file for complete search history.

(56) References Cited

U.S. PATENT DOCUMENTS

| | | | |
|---|---|---|---|
| 7,385,535 B2* | 6/2008 | Yang et al. | 341/107 |
| 7,397,402 B1* | 7/2008 | Hu | 341/107 |
| 7,932,843 B2 | 4/2011 | Demircin et al. | |
| 2008/0122662 A1* | 5/2008 | Hu | 341/51 |
| 2008/0246637 A1* | 10/2008 | Chen et al. | 341/51 |
| 2009/0089549 A1* | 4/2009 | Liu et al. | 712/208 |
| 2009/0196355 A1* | 8/2009 | Kao et al. | 375/240.25 |
| 2010/0007534 A1* | 1/2010 | Girardeau, Jr. | 341/107 |
| 2011/0228858 A1* | 9/2011 | Budagavi et al. | 375/240.25 |

FOREIGN PATENT DOCUMENTS

| | | |
|---|---|---|
| EP | 2293569 | 3/2011 |
| EP | 2293569 A1 | 3/2011 |

OTHER PUBLICATIONS

Kim et al., "High Speed Decoding of Context-based Adaptive Binary Arithmetic Codes Using Most Probable Symbol Prediction," IEEE ISCAS 2006, p. 1707-1710, 2006.*

(Continued)

*Primary Examiner* — Reza Aghevli
(74) *Attorney, Agent, or Firm* — Trop Pruner & Hu, P.C.

(57) ABSTRACT

CABAC coefficient decoding may be increased to two bins per clock by performing a calculation for a first bin followed by renormalization for the first bin in a first thread and performing a calculation for a second bin and renormalization for the second bin being after the first bin calculation and renormalization using a second thread different from the first thread.

18 Claims, 3 Drawing Sheets

(56) References Cited

OTHER PUBLICATIONS

Karwowski et al., "Improved Context-Based Adaptive Binary Arithmetic Coding in MPEG-4 AVC/H.264 Video Codec," ICCVG 2010, Part II, LNCS, pp. 25-32, Springer-Verlag, 2010.*
Marpe et al., "Context-Based Adaptive Binary Arithmetic Coding in the H.264/AVC Video Compression Standard," IEEE Trans. Circuits and Systems for Video Technology, vol. 13. No. 7, pp. 620-636, Jul. 2003.*
PCT International Search Report and Written Opinion issued in corresponding PCT/US2013/033951 dated Aug. 12, 2013 (11 pages.).
Chen, J., et al., "A High-Performance Hardwired CABAC Decoder", Acoustics, Speech and Signal Processing, 2007. ICASSP 2007. IEEE International Conference, vol. 2, Apr. 15-20, 2007 (4 pages).
Sze, V., et al., "Parallel CABAC for Low Power Video Coding," Image Processing, ICIP 2008, IEEE 15th International Conference on Oct. 12-15, 2008, (4 pages).
KR 1st office action in corresponding KR application No. 2014-7026734 dated Mar. 17, 2016 (8 pages) [no translation].
KR 2nd office action in corresponding KR application No. 2014-7026734 dated Sep. 30, 2016 (4 pages) [no translation].
KR 3rd office action in corresponding KR application No. 2014-7026734 dated Nov. 29, 2016 (4 pages) [no translation].
EP search report in corresponding EP application No. EP13768235 dated Oct. 16, 2015 (9 pages).
Chen, J-W, et al., "A high-performance hardwired CABAC decoder for ultra-high resolution video," IEEE Transactions on Consumer Electronics, vol. 55, No. 3, Aug. 2009 (9 pages).
Xia, W., et al., "Implementation strategies for CABAC decoder of H.264 for HD resolution video," Computer Engineering and Technology 2010 2nd International Conference, Apr. 2010 (5 pages).

* cited by examiner

TWO BINS PER CLOCK CABAC DECODING

CROSS-REFERENCE TO RELATED APPLICATIONS

This is a non-provisional application based on provisional application Ser. No. 61/617,333 filed Mar. 29, 2012, hereby expressly incorporated by reference herein.

BACKGROUND

This relates to the field of graphics processing.

Various techniques for coding video are described in standards promulgated by organizations such as the Moving Picture Expert Group (MPEG), the International Telecommunications Union (ITU), the International Organization for Standardization (ISO), and the International Electrotechnical Commission (IEC). For example, Context Adaptive Binary Arithmetic Coding (CABAC) is an entropy coding requirement specified in the H.264/AVC standard ITU-T/ISO/IEC H.264/MPEG-4 (Part 10) Advanced Video Coding (Video Coding for Very Low Bit Rate Communication, ITU-T Recommendation H.264 (May 2003), ITU-T Recommendation H.264: Advanced video coding for generic audiovisual services, ISO/IEC 14496-10:2005 (E)).

CABAC involves arithmetic coding which is quite high in computational complexity. Arithmetic coding takes a stream of symbols as its input stream and outputs a floating point number between 0 and 1 based on the probability of occurrence of each symbol in the input stream. The longer the input stream size, the more bits required to represent the floating point number. In order to avoid overflowing of this floating point number, a renormalization process is used.

The renormalization process uses a range value (e.g., codIRange) and an offset value (e.g., codILow) to output bits at every clock into a compressed bitstream. Binary arithmetic encoding is used to modify the codIRange value and the codILow value at every clock and to provide the modified values as inputs for the next clock. The values are used again and again in a iterative loop. When values lie outside a certain range or window, the values are renormalized and brought back within the window.

The renormalization process generally involves restricting a nine bit codIRange value and a 10 bit codILow value to specific ranges. If the codIRange value falls within a 0-255 range, the codIRange value is pushed into a 256-511 range by multiplying the codIRange value by 2 repeatedly (e.g., in N steps).

For the N iterations, if the codILow value falls in the 256-511 range, the codILow value is subtracted by 256 while incrementing a bitsOutstanding value. If the codILow value falls in the 512-1023 range, the codILow value is subtracted by 512 while outputting '1'. If the codILow value falls in the 0-255 range, the codILow value is multiplied by 2 while outputting '0'.

This renormalization process is sequential in nature and is a bottleneck in achieving a high throughput CABAC encoder. Current software solutions for CABAC renormalization take multiple cycles to normalize one value. Hardware based solutions generally take 3 to 5 cycles per bit. Typical CABAC encoders output 1 bit for every 3 to 5 clocks on the average. This means for 200 MHz clock frequency, at 1 bit for every 4 clocks, the encoding bit rate is 50 Mbps. Therefore, encoding higher bitrate video streams at real time requires higher frequency operation.

BRIEF DESCRIPTION OF THE DRAWINGS

Some embodiments are described with respect to the following figures.

DETAILED DESCRIPTION

For the video codec H.264 standard, the performance of the context-adaptive binary arithmetic coding (CABAC) parsing process is limited by the arithmetic decoding process. The arithmetic decoding process is a sequential process in which the decode process of one bin depends on the result of its previous bin. This limits the system to decoding only one bin per clock (with reasonable clock frequency).

The coefficient decoding may be improved to two bins per clock. Since coefficients comprise most of the bitstream, this coefficient decoding improvement almost doubles the decoding for low quantization parameter (QP) bitstreams (i.e. those with lots of coefficients), in some embodiments.

Context/probability prediction is added, to allow the CABAC engine to predict ahead, the state for the next bin before finishing the decoding of the first bin. This allows the CABAC engine to decode two bins without needing a longer clock period.

Figure 1:
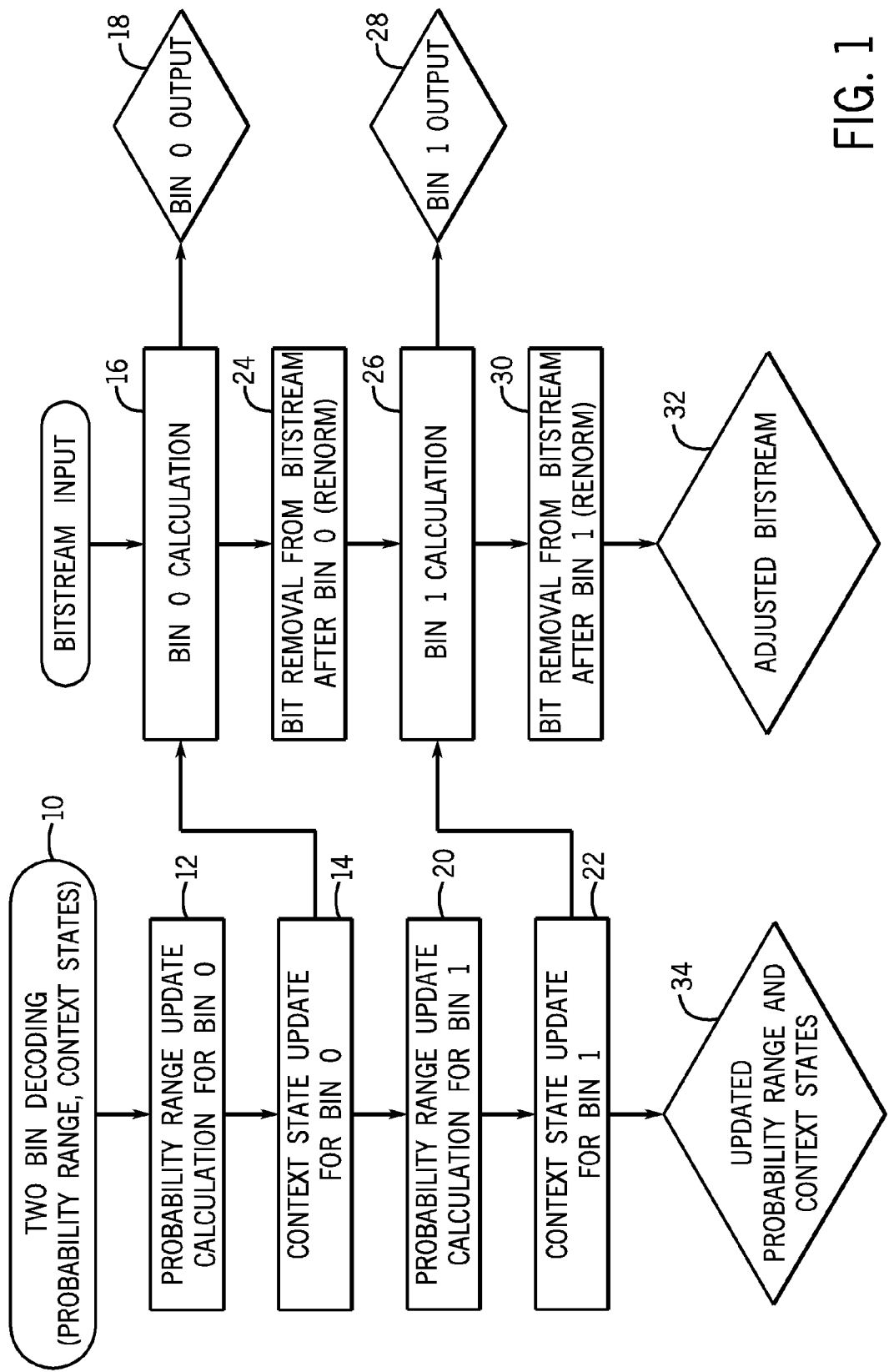
FIG. 1 is a high level flow chart for a decode decision according to one embodiment.

Referring to FIG. 1, a sequence 10 may be implemented in software, firmware and/or hardware. In software and firmware embodiments it may be implemented by computer executed instructions stored in one or more non-transitory computer readable media such as magnetic, optical or semiconductor storages.

A syntax element is mapped into binary sequences called bin strings. Context models track conditional probability of different bins in the string under conditions described in context information. When a bin is processed, it is split into two subintervals associated with least and most probable symbols.

The sequence 10 begins by determining a probability range update calculation for the first bin demoninated bin 0 (block 12). Then a context state update is done for bin 0 (block 14). Next a bin 0 calculation (block 16), which may result in a bin 0 output 18, is completed in one thread while a probability range update calculation for bin 1, the next bin, is performed at block 20 and a context date update for bin 1 is performed at block 22.

After the calculation for the first bin (bin 0), a bit removal is completed from the bitstream after bin 0 (block 24). In other words, a renormalization is done. With the probability range update and the context update for bin 1, the bin 1 calculation can be done next resulting in a bin 1 output as indicated at 26 and 28. Then the renormalization may be done for bin 1 as indicated at block 30. This produces the update the adjusted bitstream 32. At the same time an updated probability range and context states may be generated as indicated at block 34.

During CABAC decoding, three variables, codIRange, codILow and context, are recalculated for every bin decode and the updated values are used for the next bin decoding. The variable codILow is the lower bound of codIRange. The first two variables, codIRange and codILow, are global variables, which apply to every decode bin. The context, however, changes depending on the syntax element and bin number (each syntax element (SE) may have more than one bin so the first bin and second bin may have different context). The context consists of two components, pStateIdx and valMPS and the context indicates the probability of that bin being "0" or "1". A context table includes a probability status (pStatus) indicating the probability that a bin is MPS and the MPSval (VaIMPS) indicating whether MPS is 1 or 0. A new state index (pStateIdx) is always calculated per bin decoding. To get new values for Range (codIRange and codILow), the algorithm depends on whether the decoded bin matches MPSval.

Figure 2:
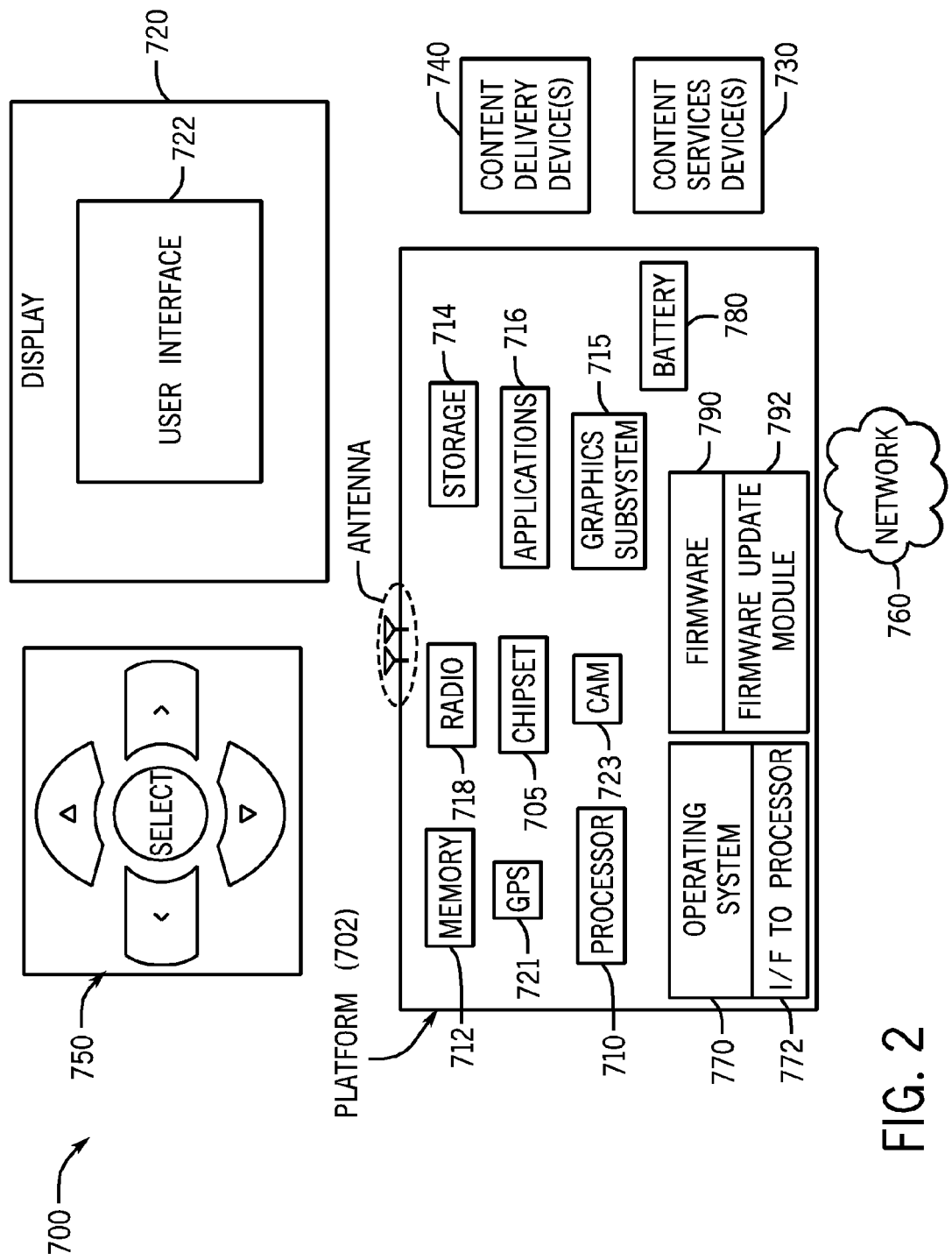
FIG. 2 is a system depiction for one embodiment.

FIG. 2 illustrates an embodiment of a system 700. In embodiments, system 700 may be a media system although system 700 is not limited to this context. The sequence 10 (FIG. 1) may be implemented by a codec 794, coupled to a processor 710. For example, system 700 may be incorporated into a personal computer (PC), laptop computer, ultra-laptop computer, tablet, touch pad, portable computer, hand-held computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 320. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments of the invention.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the invention.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 3.

Figure 3:
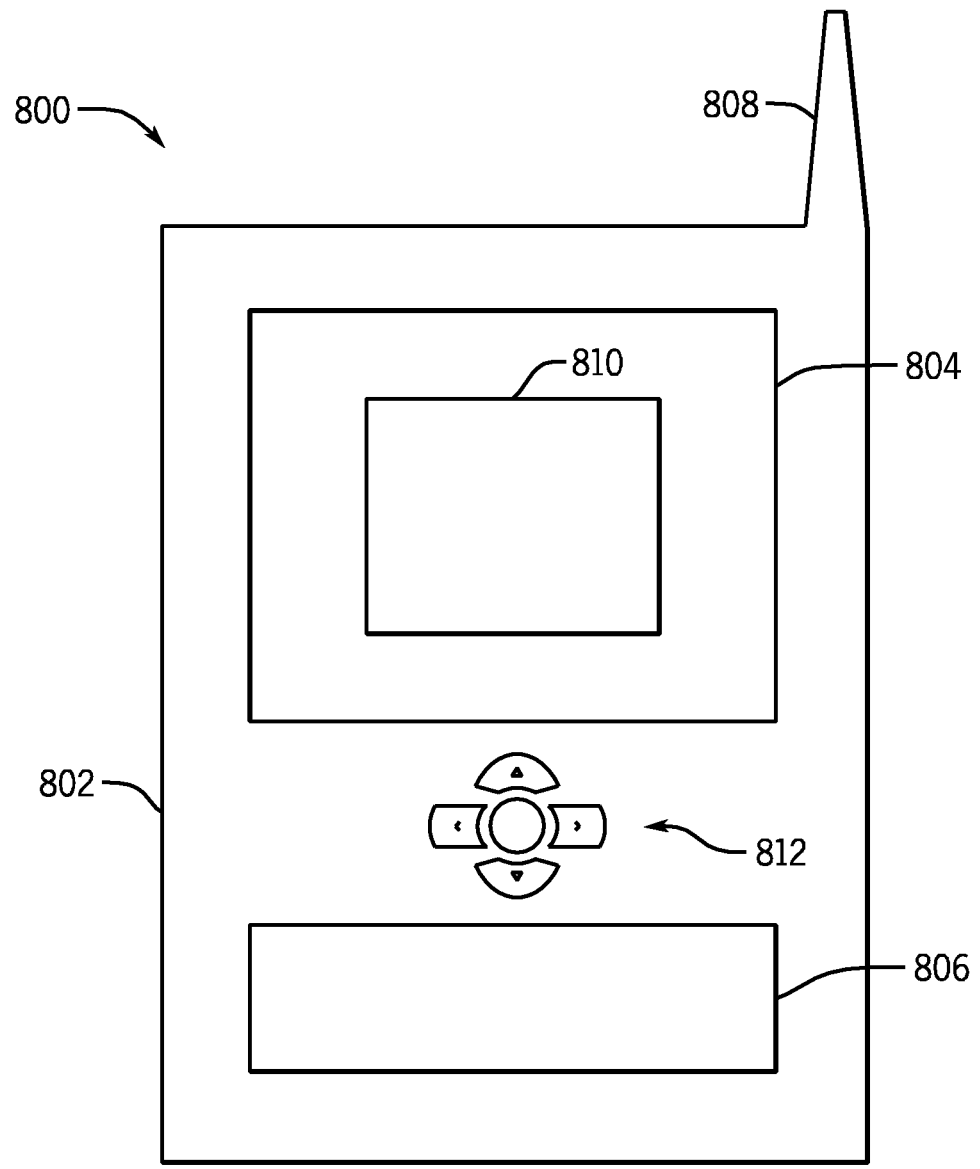
FIG. 3 is a front elevational view of one embodiment.

As described above, system 700 may be embodied in varying physical styles or form factors. FIG. 3 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

The processor 710 may communicate with a camera 722 and a global positioning system sensor 720, in some embodiments. A memory 712, coupled to the processor 710, may store computer readable instructions for implementing the sequence shown in FIG. 1 in software and/or firmware embodiments. Particularly the sequences may be implemented by one or more non-transitory storage devices storing computer implemented instructions.

As shown in FIG. 3, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

The foregoing description of one or more implementations provides illustration and description, but is not intended to be exhaustive or to limit the scope of the invention to the precise form disclosed. Modifications and variations are possible in light of the above teachings or may be acquired from practice of various implementations of the invention The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   performing in a context adaptive binary arithmetic decoder, decoding two bins per clock by predicting a state for a second bin before finishing decoding of a first bin;
   performing a probability range update and calculation for a first bin followed by renormalization for the first bin; and
   starting a probability range update for the second bin before starting the renormalization for the first bin.

2. The method of claim 1 including updating the probability range and context state for the first bin and then for the second bin in a second thread separate from said first thread.

3. One or more non-transitory computer readable media storing instructions to perform sequences comprising:
   performing in a context adaptive binary arithmetic decoder, decoding two bins per clock by predicting a state for a second bin before finishing decoding of a first bin;
   performing a probability range update and calculation for a first bin followed by renormalization for the first bin; and
   starting a probability range update for the second bin before starting the renormalization for the first bin.

4. The media of claim 3, said sequence including performing a calculation for a first bin followed by renormalization for the first bin in a first thread.

5. The media of claim 4, said sequence including performing a calculation for a second bin and renormalization for the second bin being after the first bin calculation and renormalization.

6. The media of claim 5, said sequence updating the probability range and context state for the first bin and then for the second bin in a second thread separate from said first thread.

7. An apparatus comprising:
   a context adaptive binary arithmetic decoder to decode two bins per clock by predicting a state for a second bin before finishing decoding of a first bin, to perform a probability range update and calculation for a first bin followed by renormalization for the first bin, and to start a calculation probability range update for the second bin before starting the renormalization for the first bin; and
   a memory coupled to said decoder.

8. The apparatus of claim 7 said decoder to perform a calculation for a first bin followed by renormalization for the first bin in a first thread.

9. The apparatus of claim 8, said decoder to perform a calculation for a second bin and renormalization for the second bin being after the first bin calculation and renormalization.

10. The apparatus of claim 9, said decoder to update the probability range and context state for the first bin and then for the second bin in a second thread separate from said first thread.

11. A system comprising:
    a processor to process two bins per clock during context adaptive binary arithmetic decoder decoding two bins in parallel by predicting a state for a second bin before finishing decoding of a first bin, performing a probability range update and calculation for a first bin followed by renormalization for the first bin, starting a probability range update for the second bin before starting the renormalization for the first bin; and a memory coupled to said processor.

12. The system of claim 11, said processor to perform a calculation for a first bin followed by renormalization for the first bin in a first thread.

13. The system of claim 12, said processor to perform a calculation for a second bin and renormalization for the second bin being after the first bin calculation and renormalization.

14. The system of claim 13, said processor to update the probability range and context state for the first bin and then for the second bin in a second thread separate from said first thread.

15. The system of claim 11 said processor to produce an adjusted bitstream and an updated probability range and context states at the same time.

16. The system of claim 11 including an operating system.

17. The system of claim 11 including a battery.

18. The system of claim 11 including firmware and a module to update said firmware.

* * * * *